Patented Oct. 3, 1944

2,359,342

UNITED STATES PATENT OFFICE 2,359,342

OIL DECOLORIZING AND CALCIUM SILICATE COMPOSITIONS THEREFOR

Charles C. Winding, Ithaca, N. Y., assignor to Tide Water Associated Oil Company, Bayonne, N. J., a corporation of Delaware No Drawing. Application April 15, 1941, Serial No. 388,646

4 Claims. (Cl. 23—110)

This invention relates to synthetic silicate compositions of unique properties and characteristics, useful as adsorbents and treating agents, and to methods of preparing the same. More particularly, it relates to active silicates for use in the decolorization of oils and other oil-refining operations. An important embodiment resides in the provision of an active calcium silicate composition suitable for such uses. The refining of petroleum oils with such compositions is included within the scope of the invention.

Oils are decolorized commercially by treating the same with solid substances capable of removing the color therefrom and subsequently separating the decolorized oil from the spent treating substance. Mineral lubricating oil, for example, is generally decolorized by a method known in the art as percolation, in which the oil is filtered through a bed of granular or particulated adsorbent material, for example specially treated clay such as fuller's earth; or less generally by a method known as contact decolorization comprising agitating the oil with a more finely divided adsorbent. These decolorizing methods and certain other refining operations require adsorbent substances having active decolorizing power and particular physical properties or characteristics.

I have discovered that there can be produced active calcium silicate materials suitable for use as adsorbents or refining agents in processes such as those indicated hereinabove, and particularly in the decolorization of oils.

Broadly the method of the invention comprises as an essential reaction the treatment of a magnesium silicate with an aqueous solution of a soluble calcium salt to effect an exchange of cations, resulting in formation of an exchange calcium silicate by replacing magnesium ions of the silicate source material at least in part with calcium ions. In such a reaction, various factors will influence the extent to which cation exchange proceeds. Accordingly, the "exchange calcium silicate" of the invention will be associated to greater or lesser degree with unreplaced magnesium silicate material. The term "exchange calcium silicate" as used herein denotes a calcium silicate composition produced by cation exchange with magnesium as just described, and which calcium composition may comprise both calcium silicate and magnesium silicate in varying proportional association.

Useful adsorbent or decolorizing material adaptable to either the percolation or the contact method of refining petroleum oils may be obtained by producing exchange calcium silicate according to the invention here disclosed.

In general outline I prepare exchange calcium silicates by a method involving broadly the slurrying of a more or less finely divided solid magnesium silicate in an aqueous solution of a calcium salt. Magnesium silicate for use in this treatment preferably is prepared by precipitation, but may also be prepared by reacting silicious material with basic magnesium compounds in the presence of water. While various magnesium silicates afford useful source material for the cation exchange reaction of the invention, certain benefits derive from the use of precipitated silicates. For example, I have found that the particular character of the ultimate exchange calcium silicate, in relation to its adaptability to either percolation or contact decolorizing of petroleum oils, may be readily controlled if a precipitated magnesium source material is used. This derives from my discovery that the conditions under which magnesium silicate is precipitated affect the character and decolorizing activity of the ultimate exchange calcium silicate.

The essential precipitation condition which is controlled or regulated to this end is the concentrations of the two solutions (viz: soluble silicate and soluble magnesium salt) which are used in producing precipitated magnesium silicate. Generally, equi-molar concentrations are used although this condition need not be rigidly adhered to. It is necessary, however, that the molar concentration of magnesium salt and of soluble silicate (based on the metal oxide thereof) respectively be at least about 0.25 in order that effective decolorizing activity be obtained in the calcium silicate composition later to be produced in an exchange reaction using precipitated magnesium silicate as a source material. With the indicated molar concentration in the precipitation stage, good ultimate products result, whereas molarities less than about 0.25 do not give particularly worthwhile results.

The molarity factor in the precipitation stage likewise influences the physical character of the ultimate calcium composition in respect of its utility in percolation methods on the one hand as compared with contact methods on the other. When molar concentrations of not substantially less than about 0.25 are used in the precipitation of magnesium silicate, it is possible to produce therefrom exchange calcium silicates which are structurally suited to the requirements of percolation decolorizing methods. That is to say, a fairly hard, granular and relatively coarse material effective for use as a percolant and with good decolorizing power can be so produced. The molarity of the precipitants used in producing magnesium silicate source material may be increased above 0.25 somewhat without materially decreasing the percolant effectiveness of the final calcium silicate composition while at the same time obtaining some improvement in its decolorizing power. I have found, however, that such increase in molar concentration of the precipitants should not be carried beyond a value of about 0.33 to 0.35 for at this point the physical character of the precipitated material, and consequently that of the exchange calcium silicate produced therefrom, changes and a finely divided, powdery product of the contact material type results.

If it is desired to produce directly an exchange calcium silicate for use as a contact material rather than as a percolant, it is necessary to use in the cation exchange reaction magnesium silicate precipitated from solutions of above 0.35 molar concentration. For this purpose, the molarity in question preferably is raised to about 0.50, and may be as high as 1.00, with definite advantage in the way of improved physical characteristics for contact decolorizing treatment. The decolorizing power of contact material comprising exchange calcium silicate apparently does not improve appreciably with increase in molarity above about 0.35 in the precipitation of magnesium silicate intended for use as a source material in the reaction producing calcium silicate compositions by cation exchange.

The foregoing discussion is, of course, specific to the particular case of precipitated magnesium silicate in relation to the effect of magnesium silicate source material on the production of exchange calcium silicates. It should be apparent and will be understood as an underlying general proposition that the inherent physical characteristics of exchange calcium silicates according to the invention result directly from the physical structure of the magnesium silicate used in the cation exchange reaction. If it is desired to produce directly a contact material type of calcium silicate composition, the magnesium silicate source material must have corresponding physical structure, and for the production of percolants a like situation obtains. In its broader aspect, therefore, the invention is based on the propositon of selecting as silicate source material a magnesium silicate having the physical characteristics (viz: coarse, hard and granular versus soft, fine and powdery) desired in the ultimate calcium silicate resulting from the cation exchange reaction.

For best results several other procedural factors should be observed in the precipitation of the magnesium silicate material. I have found it preferable to employ as alkali metal silicate starting materials in the precipitation reaction those silicates having high ratios of silica to alkali metal oxide. For example, sodium silicates in which the ratio of silica to sodium oxide is about 4 to 1 give optimum results. Also, the solutions of sodium silicate and magnesium salt should be mixed while hot and the mass agitated for a sufficient time to permit completion of the reaction.

As described in general manner above, the exchange reaction is conducted by agitating a slurry of the precipitated magnesium silicate in an aqueous solution of a calcium salt. Preferably this treatment is conducted at elevated temperature, and is of course extended for sufficient time to insure completion of the reaction. The concentration of the calcium salt solution must be such as to provide an excess of calcium salt over magnesium silicate to provide more equivalents of calcium than magnesium. While a single batch treatment of the magnesium silicate with calcium salt solution of proper concentration produces good results, it is desirable to repeat the treatment after removal of the spent liquid by slurrying a second time with a fresh calcium salt solution.

Another desired mode of operation which is particularly advantageous in facilitating recovery of magnesium compounds from the spent solution from the cation exchange reaction involves a countercurrent method. In this method the magnesium silicate and fresh calcium salt solution are continuously introduced and flowed countercurrently in mutual contact through suitable apparatus, the spent solution containing magnesium salt and the exchange calcium silicate being continuously removed therefrom.

The examples hereinbelow illustrate respective embodiments of methods of preparing exchange calcium silicates suited for use as decolorizing adsorbents in contact and in percolation methods for decolorizing oils.

EXAMPLE I

Two solutions were prepared and heated to about 85° C. One of these solutions consisted of 1000 c. c. of 0.4 molar magnesium chloride and the other of 1000 c. c. of sodium silicate solution of concentration 0.4 molar on the basis of $Na_2O$. The ratio by weight of $SiO_2$ to $Na_2O$ of the sodium silicate was 3.9 to 1. The magnesium chloride solution was added to the sodium silicate solution and the resulting mass agitated for about 10 minutes at the stated temperature. The mass was then filtered and the filter-cake of precipitated magnesium silicate was dried at 120° C. for about 20 hours, resulting in a finely divided powdery material without grinding.

This material was then subjected to the cation exchange reaction. This was accomplished by adding 50 grams of the stated material to 400 c. c. of a 0.5 molar calcium chloride solution, agitating the resulting slurry for about one hour at a temperature of about 85° C., then separating the spent solution, adding to the solid material 400 c. c. of a fresh calcium chloride solution of the described concentration and again agitating for the stated time and at the stated temperature. The resulting slurry was then filtered, washed and the filter-cake was dried at 120° C. for 24 hours.

The resulting dried material, consisting of finely divided exchange calcium silicate directly produced in a soft, powdery condition, was then tested for its oil decolorizing power. The test employed consisted in agitating 45 grams of the exchange calcium silicate in a substantially closed vessel for 20 minutes at a temperature of 400° F. in contact with 300 grams of an undewaxed Pennsylvania lubricating oil stock of 26.1 gravity, 50° F. pour point, 550° F. flash (closed cup) and 147 seconds Saybolt viscosity at 210° F. The mixture was then removed from the vessel and filtered.

The color of the oil thus treated was determined and compared with that of a sample of the untreated oil. The optical density method was used, the O. D. numbers being determined by the method described by Ferris and McIlvain in Industrial and Engineering Chemistry, analytical edition 6, 23 (1934). Directions as given in the stated reference were followed exactly except that a Bausch and Lomb monochromatic green filter was used as the source of monochromatic light. Lower O. D. values, as obtained in this method of color measurement, indicate more highly decolorized oils.

The described oil before treatment had an optical density value of 2620 O. D. and after treatment with the exchange calcium silicate prepared as described in Example I the color of the treated oil corresponded to a value of 675 O. D. These results show the exchange calcium silicate to be an effective contact adsorbent for oil decolorization.

EXAMPLE II

Two solutions were prepared, one consisting of 1675 c. c. of 0.30 molar magnesium chloride and the other of 1675 c. c. of the sodium silicate described in Example I, of a 0.30 molar concentration as to Na₂O. With the two solutions at 90° C. the first was added to the second and the mass agitated for about 10 minutes, the temperature being maintained at about 90° C. during this treatment. The resulting slurry was then filtered, washed and dried at 120° C. for 25½ hours.

The dried filter-cake of magnesium silicate in this case was hard and firm, in contrast with the readily powdered material obtained in Example I. The filter-cake of Example II was ground and screened to 20–60 mesh particle size.

50 grams of this material was then subjected to cation exchange in the manner described in Example I by slurrying with two successive batches of calcium chloride solution, each batch consisting of 400 c. c. of 0.5 molar calcium chloride solution. The resulting slurry, containing exchange calcium silicate, was then filtered, washed and dried at 120° C. for 20 hours. The dried filter-cake consisting of an exchange calcium silicate having substantially the physical structure of the magnesium silicate source material was reduced to 20–60 mesh particle size and tested for its decolorizing effectiveness as a percolant adsorbent for oil decolorization.

In this test the same original undewaxed Pennsylvania lubricating oil stock was used as that described in Example I. This oil is first diluted with decolorized Stoddard's solvent to give a solution of 40% oil and 60% Stoddard's solvent by volume. This oil solution is then run slowly through a bed of the adsorbent to be tested. The adsorbent bed consists of 100 c. c. of adsorbent (measured without tapping), the bed being 21 inches deep. The adsorbent bed is maintained at approximately 135° F. during the filtration of the oil solution therethrough. When the oil in the oil solution leaving the bottom of the filter reaches a color corresponding to a 7 A. S. T. M. color, as determined by color comparisons with samples of known color, the run is considered complete. The run required about 4 hours time. From the amount of oil filtered and the amount of adsorbent used in the test the yield of decolorized oil exclusive of the solvent, per unit of adsorbent, can be computed. The volume ratio, which is the ratio of the volume of decolorized oil exclusive of the solvent to the volume of adsorbent used can also be computed to afford a comparison of volume ratios of the activities of adsorbents on a volume basis. These results are summarized in the following table, which includes data obtained by testing as described the exchange calcium silicate prepared as in Example II and also that obtained by subjecting to the same test under the described test conditions an adsorbent which is now commercially used in percolation lubricating oil decolorizing. The latter material is designated as adsorbent "A."

Table

| Adsorbent | Yield (bbls. decolorized oil per ton of adsorbent used) | Volume ratio (volume of decolorized oil to volume of adsorbent used) |
|---|---|---|
| Exchange calcium silicate | 28.2 | 2.02 |
| Adsorbent "A" | 19.3 | 1.62 |

As indicated by the test data recorded in the table hereinabove, the exchange calcium silicate is an effective adsorbent in the percolation decolorization of lubricating oils both on a weight and volume basis.

I claim:

1. Method for the production of an exchange calcium silicate effective as a percolant oil decolorizing agent comprising reacting a solution of an alkali metal silicate of a concentration of at least 0.25 molar and not greater than about 0.33 to 0.35 molar, based on the alkali metal oxide contained therein, with a solution of a magnesium salt of a concentration of at least 0.25 molar and not greater than about 0.33 to 0.35 molar to produce a precipitated magnesium silicate, drying the precipitate, reducing said precipitated magnesium silicate to desired particle size and treating the particles with a solution of a calcium salt to exchange magnesium ions of the magnesium silicate with calcium ions of said calcium salt.

2. In the decoloration of mineral lubricating oil by percolation filtration the step comprising passing said oil through a bed of exchange calcium silicate prepared by the method set forth in claim 1.

3. An exchange calcium silicate composition having oil decolorizing activity and specially characterized by physical properties including a hard granular structure making it suitable for percolation oil filtration, said composition having been prepared by precipitating under controlled conditions a magnesium silicate material, drying said material and then treating the dried material with an aqueous solution containing calcium ions to exchange magnesium ions of the magnesium silicate with calcium ions.

4. Method for producing a calcium silicate composition effective as an adsorbent in percolation filtration of lubricating oils which comprises precipitating a magnesium silicate from an aqueous solution, filtering and drying the precipitate to produce a dry filter-cake, said precipitation being conducted under conditions effective to produce in the dry filter-cake a hard granular structure, subsequently reducing the dried filter-cake to desired particle size and treating the resulting magnesium silicate particles with a calcium salt solution to exchange magnesium ions with calcium ions.

CHARLES C. WINDING.